United States Patent [19]

Tsuji

[11] Patent Number: 4,882,618
[45] Date of Patent: Nov. 21, 1989

[54] FM SIGNAL DEMODULATOR FOR VIDEO SIGNAL REPRODUCING APPARATUS

[75] Inventor: Masaki Tsuji, Fukaya, Japan
[73] Assignee: Kabushiki Kaisha Toshiba, Kanagawa, Japan
[21] Appl. No.: 302,140
[22] Filed: Jan. 27, 1989

Related U.S. Application Data

[63] Continuation of Ser. No. 38,661, Apr. 15, 1987, abandoned.

[30] Foreign Application Priority Data

Apr. 15, 1986 [JP] Japan .................. 61-86610

[51] Int. Cl.[4] ........................... H04N 5/213
[52] U.S. Cl. ..................... 358/167; 358/36; 358/336
[58] Field of Search ............ 358/167, 23, 36, 336, 358/340, 905

[56] References Cited

U.S. PATENT DOCUMENTS

| | | | |
|---|---|---|---|
| 4,575,760 | 3/1986 | Nakagaki | 358/167 |
| 4,577,238 | 3/1986 | Watanabe | 358/167 |
| 4,597,021 | 6/1986 | Yamamitsu | 358/336 |
| 4,622,520 | 11/1986 | Kuroda | 358/167 |
| 4,682,251 | 7/1987 | Hirota | 358/167 |
| 4,684,976 | 8/1987 | Sugihara | 358/36 |
| 4,748,498 | 5/1988 | Yamanishi | 358/36 |
| 4,768,092 | 8/1988 | Ichinoi | 358/167 |

Primary Examiner—Tommy P. Chin
Attorney, Agent, or Firm—Finnegan, Henderson, Farabow, Garrett, & Dunner

[57] ABSTRACT

An FM demodulator for a video signal reproducing apparatus, which is responsive to an input FM luminance signal. The FM demodulator includes an FM demodulation circuit for changing the input FM signal to a base band luminance signal and a noise removing circuit for substantially removing noise from the base band luminance signal. The noise removing circuit is comprised of a clipping circuit for removing portions of the base band luminance signal carrying the noise and an amplitude expansion circuit for increasing the amplitude of the luminance signal at the location of the removed portions to a predetermined level.

11 Claims, 6 Drawing Sheets

Fig. 1.
(a)
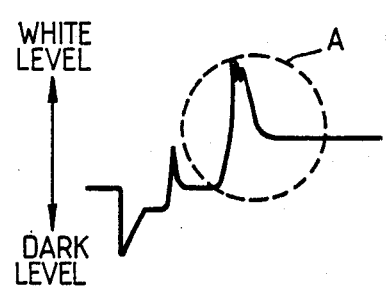
(b)
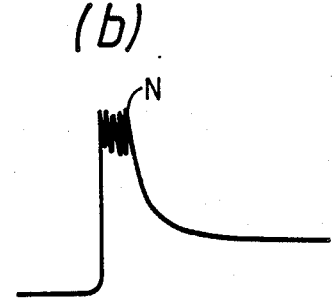
(c)
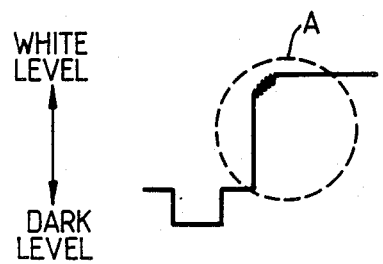
(d)
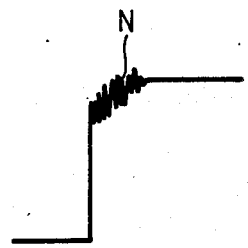
(PRIOR ART)

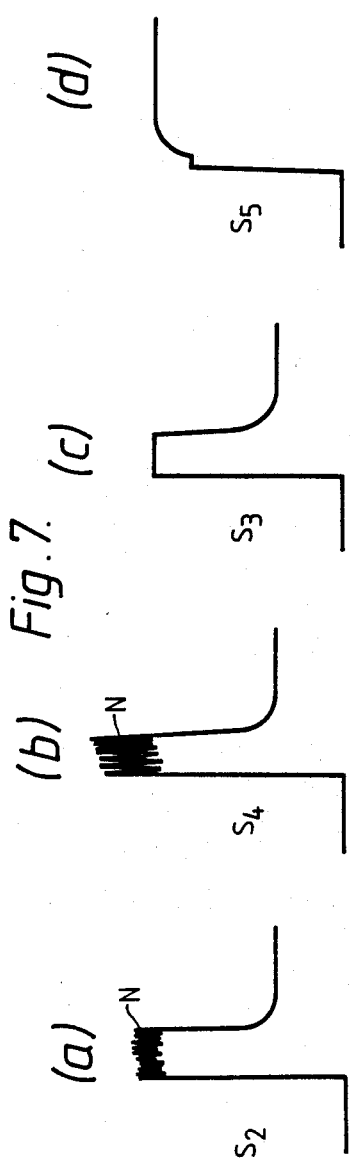
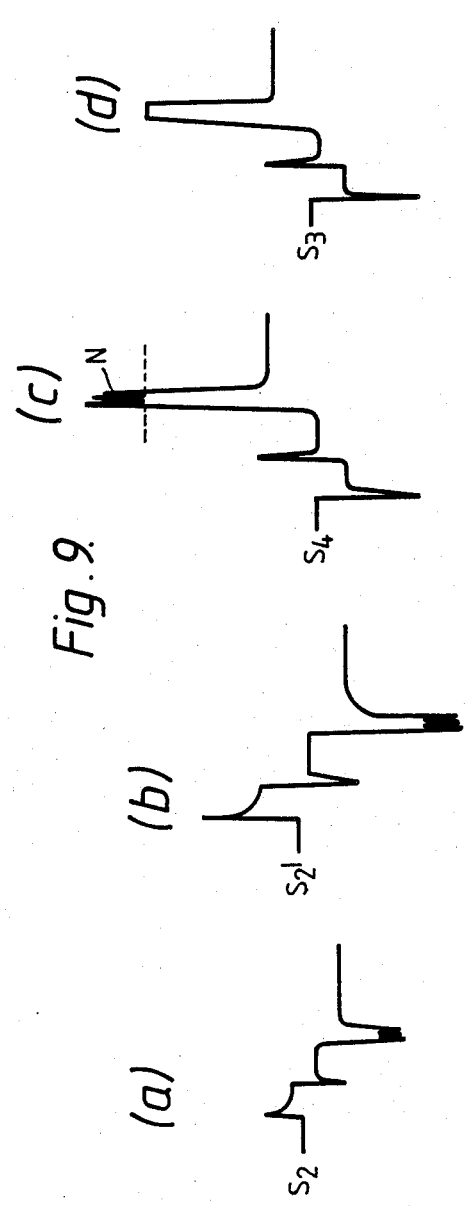

FM SIGNAL DEMODULATOR FOR VIDEO SIGNAL REPRODUCING APPARATUS

This application is a continuation of application Ser. No. 038,661 filed Apr. 15, 1987, now abandoned.

BACKGROUND OF THE INVENTION

1. Field of Invention

This invention relates to a demodulator for a frequency modulation signal (referred as FM signal hereafter) and more particularly to an FM signal demodulator for video signals, such as luminance signals, of video signal reproducing apparatus.

2. Description of the Prior Art

Recently, in the fields of video signal reproducing apparatus such as television receivers (referred as TV receivers hereafter) and/or video tape recorders (referred as VTRs hereafter), many improvements have been made for raising the quality of pictures or images on the image display screen of TV receivers or VTRs. As is well known, both the sharpness and the signal to noise ratio (referred as S/N ratio hereafter) of the picture are especially important factors for raising picture quality.

The sharpness of a picture is influenced by the frequency response characteristics, i.e., the signal waveform response characteristics of picture reproducing circuits in TV receivers and/or VTRs. For example, when the signal waveform response characteristics of the picture reproducing circuits are insufficient at a leading end portion and a trailing end portion of respective pulse-shaped signals, such as luminance signals in video signals, the resulting pictures on the image display screen become inferior in sharpness. As is well known, the luminance signal is included in a composite video signal together with other signals, such as color signals. In a record mode of VTRs, the luminance signal is frequency-modulated with a prescribed carrier signal (a resultant signal will be referred to as FM luminance signal hereafter). The color signal or chrominance signal is frequency-converted to a frequency band lower than the FM luminance signal band. The low frequency-conversion chrominance signal is superimposed on the FM luminance signal (a resultant signal will be referred as a record mode composite signal hereafter). Then the record mode composite signal is recorded on a magnetic tape. In a playback or reproducing mode of the VTRs, the composite signal reproduced from the magnetic tape is separated to the FM luminance signal and the low frequency-conversion chrominance signal. The FM luminance signal is frequency-demodulated and restored to the original luminance signal (referred as base band luminance signal hereafter). The low frequency-conversion chrominance signal is also frequency-converted to the original frequency band. The restored base band luminance signal and the chrominance signal are again combined so that the original composite signal (referred as base band composite signal hereafter) is obtained. The signal waveform response characteristics of a picture reproducing circuit is determined by the frequency transmission range of the circuit. Therefore, in order to obtain good signal waveform response characteristics, it is necessary to make the frequency transmission range of the picture reproducing circuits wider. In particular, it is desired to expand the frequency transmission range to a frequency as high as possible.

Many attempts have been made for raising the signal waveform response characteristics of picture reproducing circuits. However, it has become difficult to further increase the signal waveform response characteristics, because the frequency transmission range of the picture reproducing circuits has expanded to a relatively wide range as a result of recent progress in circuit design. Particularly, the improvement of the picture quality in VTRs by raising the signal waveform response characteristics has become difficult. This is because the frequency transmission range of the picture reproducing circuits in VTRs is restricted to a narrower rang than the range of such circuits in TV receivers.

Further, in VTRs an FM signal, recorded on the magnetic tape, has a property in that the FM signal is reduced its amplitude at a high frequency region due to a principle of magnetic tape recording. Accordingly, a reproduced FM signal is worsened its carrier to noise ratio (refered as C/N ratio hereafter) at the high frequency region in an input to output response characteristic.

Accordingly, the improvement of the picture quality has been attempted from the standpoint of the S/N ratio of the picture on the image display screen. However, an increase of the S/N ratio of the picture occasionally is accompanied by a reduction of the frequency transmission range, i.e., a deterioration of the signal waveform response characteristics of the picture reproducing circuits. For example, when an attempt is made to improve the S/N ratio, especially in VTRs, the signal waveform response characteristics deteriorate, so that a significant noise arises on the leading and/or trailing end portion of respective pulse-like signals, such as luminance signals in the FM signal band of the composite video signal. Therefore it is important to increase the S/N ratio while maintaining the signal waveform response characteristics at a prescribed level.

Conventionally, there are following several know methods for raising the S/N ratio of pictures in VTRs.

(1) Increasing the amount of emphasis in an emphasis circuit in a picture recording circuit, in advance of reproducing pictures.

(2) Increasing the amount of cancelling in a noise canceller circuit in a picture reproducing circuit.

(3) Increasing the signal component with a relatively high C/N ratio (carrier to noise ratio) in the FM signal, in other words a low frequency signal component which is lower than the carrier signal, for raising the S/N ratio of a baseband signal after FM demodulation.

The conventional methods, however, have drawbacks as described below. When attempting to increase the amount of emphasis, as in method (1), some frequency signal components fail to carry out white level clipping and dark level clipping, so that the signal waveform response characteristics deteriorate.

In method (2), the noise canceller circuit extracts the high frequency component from the luminance signal, reverses the phases of the extracted signals after limiting the amplitudes of the high frequency component by a limiter and then adds the extracted signals to the original luminance signal. Thus, a noise with a low level and a high frequency in the original luminance signal is cancelled by the noise in the extracted signals. When an attempt is made to increase the amount of cancelling, the S/N ratio of signals is improved at flat waveform portions of the waveform. However, the noise is not removed at waveform change portions in which the signal steeply changes over a large amplitude, and has a high frequency component. For instance, this may occur in the section where the signal changes from the dark level to the white level. Moreover, the dulation of such noise increases. Therefore, the signal waveform response characteristics deteriorate and the noise in the waveform change section becomes more pronounced.

In method (3), when the lower side band signal component, is increased, a reversal phenomenon of the picture signal from the dark level to the white level occurs more easily and, at the same time, the image quality declines at the portion where dark level changes to white level. More particularly, the portion of the waveform changing from the dark level to the white level is the portion where the carrier signal of the FM signal moves at the highest frequency. Consequently, the C/N ratio of the signal becomes worst at the waveform change portion. Therefore, in method (3), which does not use a signal component with a bad C/N ratio, as that above, although the S/N ratio in the flat waveform portion is improved, the waveform change portion where the signal changes from the dark level to the white level deteriorates. Incidentally, one of the causes of signal deterioration is the fact that when the signal at the portion changing from the dark level is frequency-modulated, a frequency of the FM luminance signal is located in the upper end of the FM signal transmission band. This is to avoid using components with a low C/N ratio. That is to say, in method (3), the amplitude and phase of the FM signals tend to be distorted in the transmission path. As a result, the waveform change portion from the dark level to the white level deteriorates, so that the noise in this waveform change portion becomes more pronounced.

As explained above, when an attempt is made to improve the S/N ratio of the luminance signal in prior art VTRs, the signal waveform response characteristics deteriorate and, moreover, the noise in the waveform change portion substantially increases. Therefore, the S/N ratio can only be set at a compromise between these two. As a result, the prior art VTRs have a problem in that the S/N ratio of the signal worsens in the portion of the waveform which changes from the dark level to the white level.

FIG. 1 shows method (3) used in the prior art VTRs. Graph (a) in FIG. 1 shows a waveform of a luminance signal just after a video signal has been restored to the base-band by demodulation. Graph (b) in FIG. 1 is an enlargement of section A of the waveform shown by graph (a) in FIG. 1.

As seen from graph (b) in FIG. 1, it is clear that there is a great deal of noise at the tip of the leading end portion (the portion where signal changes from the dark level to white level). When the luminance signal has passed through a de-emphasis circuit and a noise canceller circuit, the luminance signal with a waveform, as shown by graph (c) in FIG. 1 can be obtained. Graph (d) in FIG. 1 is an enlargement of section A of the waveform shown by graph (c) in FIG. 1. As is clear from graph (d) in FIG. 1, the noise on the tip of the leading end portion remains, and is not totally removed by the de-emphasis circuit or the noise canceller circuit. As a result, the contrast at the boundary of pictures presented on the image display screen is adversely effected by the noise, and this leads to deterioration of picture quality.

SUMMARY OF THE INVENTION

Accordingly, an object of the present invention is to provide an FM signal demodulator for video signals which is able to remove the noise existing at a waveform change portion where the luminance signal steeply changes over a large amplitude without deterioration of the signal waveform response characteristics.

Another object of the present invention is to provide an FM signal demodulator for video signals of video tape recorders which is able to remove the noise existing in a waveform change portion where the luminance signal steeply changes over a large amplitude without deterioration of the signal waveform response characteristics. A further object of the present invention is to remove the noise existing in a waveform change portion where a luminance signal changes from a dark level to a white level without deterioration of the signal waveform response characteristics.

Additional objects and advantages will be obvious from the description which follows, or may be learned by practice of the invention.

In order to achieve the above objects, the FM demodulator for a video signal reproducing apparatus, which is responsive to an input FM signal, includes an FM demodulation circuit for changing the input FM signal to the base band luminance signal and a noise removing circuit for substantially removing noise from the variable amplitude video signal. The noise removing circuit is comprised of a clipping circuit for removing portions of the variable amplitude video signal carrying the noise and an amplitude expansion circuit for increasing the amplitude of the luminance signal at the location of the removed portions to a predetermined level.

In the FM demodulator of the present invention, noise existing in the section where dark level changes to white level can be removed by the clipping process. The missing signal in the changing section due to the clipping process can be compensated by the expansion process. Consequently, when using this invention, both the S/N ratio in the changing section and the waveform characteristics can be satisfied.

BRIEF DESCRIPTION OF THE DRAWINGS

FIG. 1 is a waveform diagram showing signals in a prior art FM demodulator for video signals in VTRs.

FIG. 7 is a waveform diagram showing signals in the circuit of FIG. 6;

FIG. 9 is a waveform diagram of signals in the circuit of FIG. 8.

DESCRIPTION OF THE PREFERRED EMBODIMENT

Figure 2:
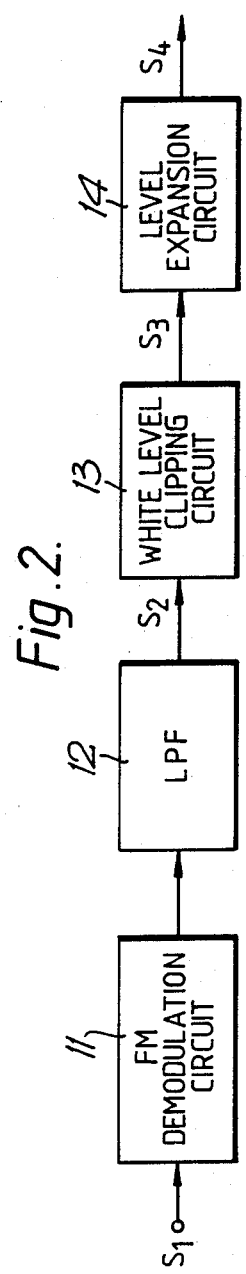
FIG. 2 is a circuit block diagram showing a first embodiment of the FM demodulator for video signals according to the present invention.

The present invention will now be described in detail with reference to the accompanying drawings, namely, FIGS. 2 to 9. Throughout the drawings, like reference numerals and letters are used to designate like or equivalent elements, for the sake of simplicity of explanation.

Figure 3:
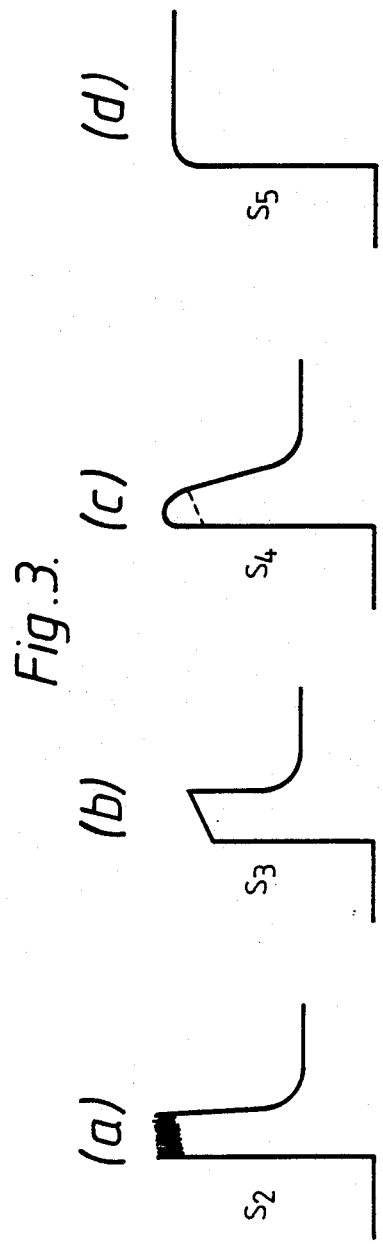
FIG. 3 is a waveform diagram showing signal waveforms in the circuit of FIG. 2.

Referring now to FIGS. 2 to 5, a first embodiment of an FM demodulator for video signals according to the present invention will be described in detail. FIG. 2 is a circuit block diagram showing the first embodiment of the FM demodulator. FIG. 3 is a diagram showing signal waveforms in the circuit of FIG. 2.

In FIG. 2, the FM luminance signal S1 is applied to an FM demodulation circuit 11. The FM demodulation circuit 11 demodulates the FM luminance signal band. The demodulated signal is applied to a low pass filter (referred as LPF hereafter) 12 so that a baseband luminance signal S2, as shown by graph (a) in FIG. 2, is obtained as an output of the LPF 12. A tip of the leading end portion of the waveform of this baseband luminance signal S2 usually carries a noise signal N. The luminance signal S2 is applied to a white level clipping circuit 13, wherein the luminance signal S2 is clipped at a white level specified as the threshold level, so that the tip with noise signal N is cut out or removed, as shown by graph (b) in FIG. 3. This clipped luminance signal S3 then is applied to a level expansion circuit 14. This level expansion circuit 14 only responds to the leading end portion of the clipped luminance signal S3 and expands the amplitude level of the leading end portion. As a result, the leading end portion of the clipped luminance signal S3 is restored or compensated to the original level, but without the noise signal N, as shown by graph (c) in FIG. 3. The expanded luminance signal S4 is applied to a de-emphasis circuit and/or a noise cancelling circuit (not shown), as usual. Then, prescribed de-emphasis and/or noise suppression processing is carried out for the expanded luminance signal S4. As a result, a signal S5 with excellent waveform characteristics, as shown by graph (d) in FIG. 3, is obtained as the resulting luminance signal.

Figure 4:
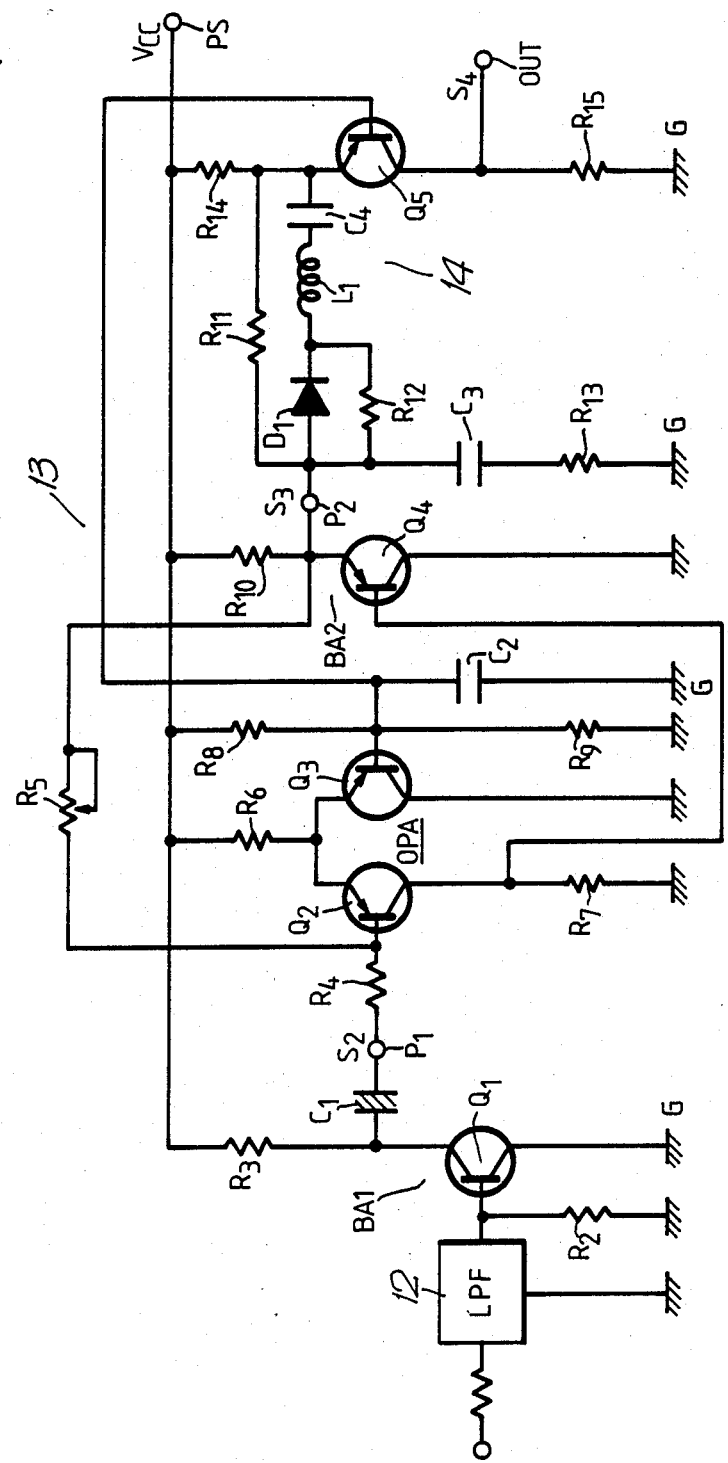
FIG. 4 is a circuit diagram showing an example of a practical circuit arrangement of the FM demodulator of FIG. 2.

FIG. 4 shows practical circuits of the white level clipping circuit 13 and the level expansion circuit 14 in FIG. 2. In FIG. 4, references Qi (i=1, 2 . . ., the same hereinafter) represent transistors, references Di represent diodes, references Ri represent resistors, references Ci represent capacitors and references Li represent inductors. The same reference system will be used in FIG. 8, mentioned later.

In FIG. 4, the white level clipping circuit 13 is comprised of first to fourth PNP transistors Q1, Q2, Q3 and Q4 as main active elements of the circuit, while the level expansion circuit 14 is comprised of a diode D1, a fifth PNP transistor Q5, an inductor L1, a capacitor C4, etc. In the white level clipping circuit 13, the first transistor Q1 constitutes an input buffer amplifier BA1 together with a base bias resistor R2 and an emitter load resistor R3. The base terminal of the first transistor Q1 is connected to a ground terminal G through the base bias resistor R2. The collector terminal of the first transistor Q1 is connected directly to the ground terminal G. The emitter terminal of the first transistor Q1 is connected to a power supply source terminal PS with a voltage Vcc through the emitter load resistor R3. Further, the emitter terminal of the transistor Q1 is connected to the base terminal of the second transistor Q2 through a series circuit of a coupling capacitor C1 and a resistor R4.

The second and third transistors Q2 and Q3 constitute an inverted type operational amplifier OPA together with a feedback resistor R5, a common emitter resistor R6, a collector load resistor R7, base bias resistors R8 and R9 and a capacitor C2. The second and third transistors Q2 and Q3 are connected at their emitter terminals to each other, and the emitter terminals are connected to the power supply source terminal PS through the common emitter resistor R6. The collector of the second transistor Q2 is connected to the ground terminal G through the collector load resistor R7. While the collector of the third transistor Q3 is connected directly to the ground terminal G. The base terminal of the third transistor Q3 is connected to the ground terminal G through a parallel circuit of the base bias resistor R9 and the capacitor C2. Further, the base terminal of the third transistor Q3 is connected to the power supply source terminal PS. The collector terminal of the second transistor Q2 is connected to the base terminal of the fourth transistor Q4.

The fourth transistor Q4 constitutes an output buffer amplifier BA2 together with an emitter [load] resistor R10. The collector of the fourth transistor Q4 is connected directly to the ground terminal G. The emitter terminal of the fourth transistor Q4 is connected to the power supply source terminal PS through the emitter [load] resistor R10. Further, the emitter terminal of the fourth transistor Q4 is connected to the base terminal of the second transistor [Q3] Q2 in the operational amplifier OPA through the feedback resistor R5. The emitter terminal of the fourth transistor Q4 is connected to the anode terminal of the diode D1 in the level expansion circuit 14.

In the level expansion circuit 14, the diode D1 is connected at its anode terminal to the ground terminal G through a series circuit of a capacitor C3 and a resistor R13. Further, the anode terminal of the diode D1 is connected to the power supply source terminal PS through a series circuit of resistors R11 and R14. The cathode terminal of the diode D1 is connected to the emitter terminal of the fifth transistor Q5 through a series circuit of the inductor L1 and the capacitor C4. The series circuit of the inductor L1 and the capacitor C4 constitutes a peaking circuit PE, as described later. Further, the cathode terminal of the diode D1 is connected to the anode terminal through a resistor R12. The fifth transistor Q5 is connected at its emitter terminal to the power supply source terminal PS through the resistor R14. The base terminal of the fifth transistor Q5 directly is connected to the base terminal of the third transistor Q3 in the operational amplifier OPA of the white level clipping circuit 13. The collector terminal of the fifth transistor Q5 is connected to the ground terminal G through a resistor R15. Further, the collector terminal of the fifth transistor Q5 is connected to an output terminal OUT.

Figure 5:
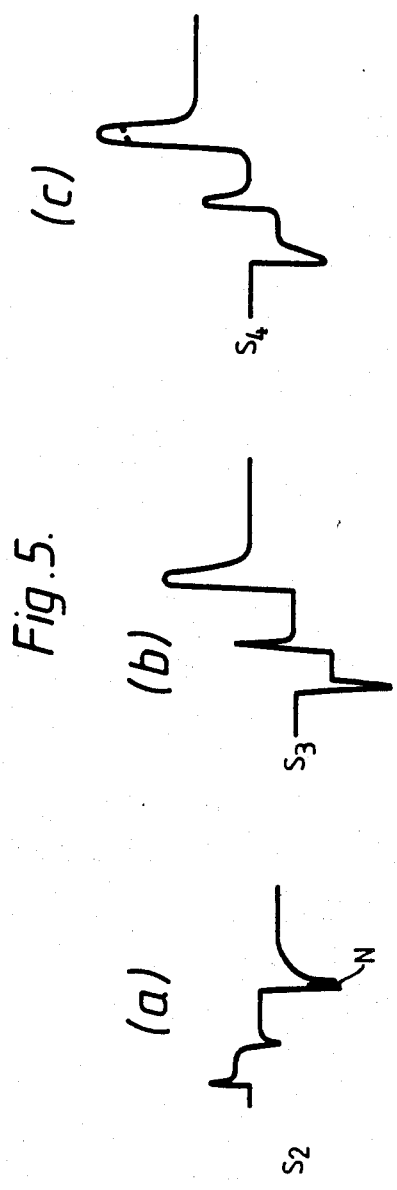
FIG. 5 is a waveform diagram of signals in the circuit of FIG. 4.

The baseband luminance signal S2 outputted from the LPF 12 is applied to the inverted-type operational amplifier OPA through the input buffer amplifier BA1, the coupling capacitor C1 and the resistor R4. Here, the polarity of luminance signal S2 at a terminal P1 between the coupling capacitor C1 and the resistor R4 is negative, as shown by graph (a) in FIG. 5. The luminance signal S2 is clipped at its tip end at a prescribed level in the operational amplifier OPA, as described later. Thus, a clipped luminance signal S3, as shown by graph (b) in FIG. 5, is obtained at a terminal P2 between the emitter terminal of the fourth transistor Q4 and the anode terminal of the diode D1 in the level expansion circuit 14. The output of the output buffer amplifier BA2 is grounded through the capacitor C3 and the resistor R13. Therefore, the polarity of the clipped luminance signal S3 at the terminal P2 is positive, as shown by graph (b) in FIG. 5.

When the leading end portion of the luminance signal S2 is applied to the operational amplifier OPA, the potential of the emitter terminal of the fourth transistor Q4 which operates as the output buffer amplifier BA2 is closest to the power source voltage Vcc. Thus, an emitter current of the output buffer amplifier BA2, which drives load elements such as the capacitor C3, the resistor R13 and the like, becomes minimum. Therefore the output buffer amplifier BA2 fails to drive them. As a result, the leading end portion of the luminance signal S2 is clipped at the prescribed level near the power source voltage Vcc. As a result, the clipped luminance signal S3, as shown by graph (b) in FIG. 5, is obtained at the terminal P2. At this time, since the clipped luminance signal S3 is fed back to the base terminal of the second transistor Q2 of the operational amplifier OPA via the feedback resistor R5, the feedback signal operates to compensate the removed portion of the luminance signal S2. By this compensating operation, the signal waveform of the clipped leading end portion gradually rises toward its trailing end.

Furthermore, the output of the output buffer amplifier BA2, i.e., the fourth transistor Q4, is applied to the fifth transistor Q5, which constitutes a grounded-base type amplifier through the diode D1. The diode D1 changes to the ON state when the high amplitude level of the leading end portion of the luminance signal S3 is applied. Thus, a peaking operation for the leading end portion of the luminance signal S3 is carried out by the series circuit of the inductor L1 and the capacitor C4, i.e., the peaking circuit PE. If the resonant frequency of the peaking circuit PE is set about 1 MHz, which is the most central component of the leading end portion, the clipped leading end portion of the luminance signal S3 is expanded in its amplitude level. As a result, a signal S4 is obtained, as shown by graph (c) in FIG. 5, which has compensated for the clipped portion of the luminance signal S2, due to the clipping operation in the white level clipping circuit 13. Incidentally, the second to fourth transistors Q2 - Q4 are set to the high gain states, respectively, in order to put the diode D1 in the ON state when the leading end portion of the luminance signal S2 is inputted. Also, the coupling capacitor C1 has a function of preventing a variation of the clipping operation due to a frequency drift of the carrier signal of the FM signal band, and a level drift of the output signal of the FM demodulation circuit 11 in the recording mode.

As explained in detail above, the first embodiment is designed so that the noise N appearing on the leading end portion of the luminance signal S2 is removed by the clipping operation in the white level clipping circuit 13, and the removed portion due to the clipping operation is compensated by the expansion operation. Therefore, in this embodiment, the S/N ratio can be improved without causing deterioration of the waveform characteristics. Thus a high-quality picture can be obtained without affect by the noises on the picture portion where the luminance signal changes from the dark level to the white level.

Figure 6:
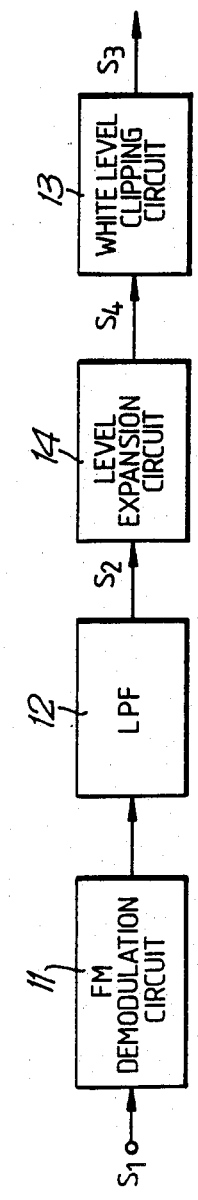
FIG. 6 is a circuit block diagram showing a second embodiment of the FM demodulator for video signals according to the present invention.

In the first embodiment, the expansion operation is carried out after the clipping operation, for compensating the removed portion of the luminance signal S2 due to the clipping operation. However, the expansion operation may be carried out prior to the clipping operation. An embodiment for the latter case, i.e., a second embodiment of the present invention, will now be described in reference to FIGS. 6 to 9. In FIG. 6, the order of the white level clipping circuit 13 and the expansion circuit 14 is reversed, as compared to that in FIG. 2. Waveform diagrams of signals in the circuit of FIG. 6 are shown in FIG. 7. According to the second embodiment, the luminance signal S2 (see graph (a) in FIG. 7) is first expanded in its amplitude level in the expansion circuit 14 so that a signal S4, as shown by graph (b) in FIG. 7, is obtained. In the expansion operation the noise signal N on the leading end portion of the luminance signal S2 also is expanded, as shown by graph (b) in FIG. 7.

Figure 8:
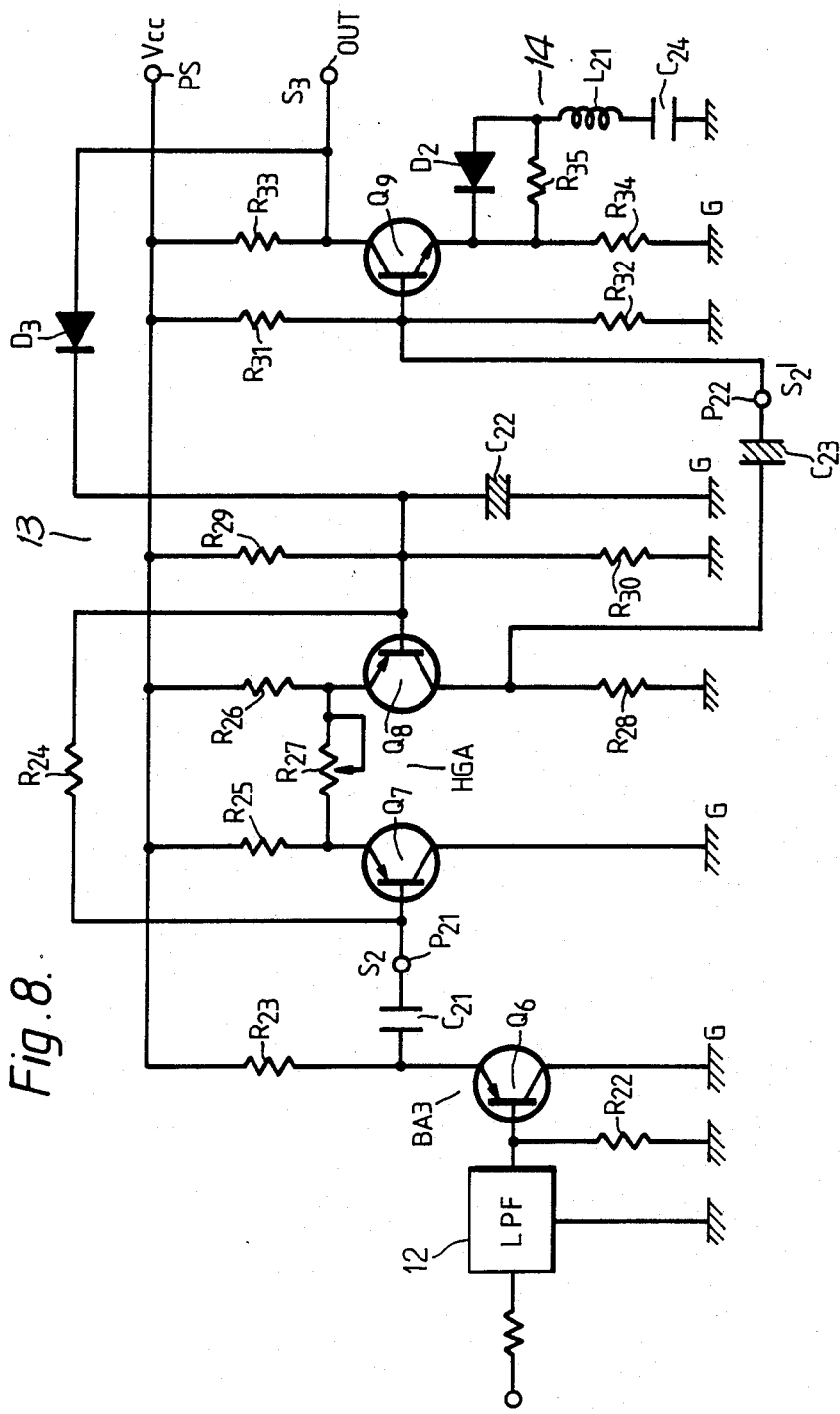
FIG. 8 is a circuit diagram showing an example of a practical circuit arrangement of the FM demodulator of FIG. 6.

FIG. 8 shows practical circuits of the level expansion circuit 14 and the white level clipping circuit 13 in FIG. 6. In FIG. 8, references Qi, Di, Ri, Ci and Li represent transistors, diodes, resistors, capacitors and inductors, respectively. In FIG. 8, the level expansion circuit 14 is comprised of sixth to ninth PNP transistors Q6, Q7, Q8 and Q9, a second diode D2, an inductor L21, a capacitor C24 etc. The ninth PNP transistor Q9 itself constitutes the white level clipping circuit 13 together with a third diode D3. In the expansion circuit 14, the sixth transistor Q6 constitutes an input buffer amplifier BA3 together with a base bias resistor R22 and an emitter load resistor R23. The base terminal of the sixth transistor Q6 is connected to a ground terminal G through the base bias resistor R22. The collector terminal of the sixth transistor Q6 is connected directly to the ground terminal G. The emitter terminal of the sixth transistor Q6 is connected to a power supply source terminal PS with a voltage Vcc through the emitter resistor R23. Further, the emitter terminal of the transistor Q6 is connected to the base terminal of the seventh transistor Q7 through a series circuit of a coupling capacitor C21 and a resistor R24.

The seventh and eighth transistors Q7 and Q8 constitute a high gain non-inverted type amplifier HGA together with a feedback resistor R24, emitter resistors R25 and R26, a collector load resistor R28, base bias resistors R29 and R30 and a capacitor C22. The seventh and eighth transistors Q7 and Q8 are connected at their emitter terminals to each other through the resistor R27, and the emitter terminals are connected to the power supply source terminal PS through the emitter resistors R25 and R26, respectively. The collector terminal of the seventh transistor Q7 is connected directly to the ground terminal G. The collector of the eighth transistor Q8 is connected to the ground terminal G through the collector load resistor R28. The base terminal of the eighth transistor Q8 is connected to the ground terminal G through a parallel circuit of the base bias resistor R30 and the capacitor C22. Further, the base terminal of the eighth transistor Q8 is connected to the power supply source terminal PS through the base bias resistor R29. Also, the base terminal of the eighth transistor Q8 is connected to the base terminal of the seventh transistor Q7 through the feedback resistor R24. The collector terminal of the eighth transistor Q8 is connected to the base terminal of the ninth transistor Q9 through a coupling capacitor C23. The ninth transistor Q9 is connected at its base terminal to the ground terminal G through a base bias resistor R 32. Further the base terminal of the ninth transistor Q9 is connected to the power supply source terminal PS through another base bias resistor R31. The emitter terminal of the ninth transistor Q9 is connected to the ground terminal G through an emitter resistor R34. Further, the emitter terminal of the ninth transistor Q9 is connected to the cathode terminal of the second diode D2. The second diode D2 is connected at its anode terminal to the ground terminal G through a series circuit of the inductor L21 and the capacitor C24. The series circuit of the inductor L21 and the capacitor C24 constitutes a peaking circuit for the leading end portion of the luminance signal, as described later. Further, the anode terminal of the second diode D2 is connected to the cathode terminal thereof, through a resistor R35. The collector terminal of the ninth transistor Q9 is connected to the power supply source terminal PS through a collector load resistor R33. Further, the collector terminal of the ninth transistor Q9 is connected to the base terminal of the eighth transistor Q8 in the level expansion circuit 14 through the third diode D3, for clipping. The third diode D3 operates to clip the luminance signal at a prescribed level, as described later. Also the collector terminal of the ninth transistor Q9 is connected to an output terminal OUT of the circuit.

The baseband luminance signal S2 outputted from the LPF 12 is applied to the high gain non-inverted type amplifier HGA through the input buffer amplifier BA3 and the coupling capacitor C21. Here, the polarity of luminance signal S2 at a terminal P21 between the coupling capacitor C21 and the seventh transistor Q7 is negative, as shown by graph (a) in FIG. 9. The luminance signal S2 is applied to the high gain non-inverted type amplifier HGA so that an amplified luminance signal S2', as shown by graph (b) in FIG. 9, is obtained on a terminal P22 between the coupling capacitor C23 and the base terminal of the ninth transistor Q9. The amplified luminance signal S2' is applied to the ninth transistor Q9. The second diode D2 turns ON the high amplitude level of the leading end portion of the luminance signal S2' is applied. Thus, a peaking operation for the leading end portion of the luminance signal S2' is carried out by the series circuit of the inductor L21 and the capacitor C24, i.e., the peaking circuit PE. If the resonant frequency of the peaking circuit PE is set about 1 MHz, which is the most central component of the leading end portion, the leading end portion of the luminance signal S2' is expanded in its amplitude level. As a result, a signal S4, as shown by graph (c) in FIG. 9, is obtained. The expanded luminance signal S4 is reversed in its polarity on the collector terminal of the ninth transistor Q9, as shown by graph (c) in FIG. 9. When the leading end portion of the luminance signal S2' is applied, the potential of the collector terminal of the ninth transistor Q9 is closest to the power source voltage Vcc. Thus, the leading end portion of the luminance signal S4 is clipped at the prescribed level, which is determined by the base bias resistors R29 an R30, near the power source voltage Vcc. As a result, an output signal S3, as shown by graph (d) in FIG. 9, is obtained at the output terminal OUT. As clearly seen from the waveform of the clipped luminance signal S3, as shown by graph (d) in FIG. 9, the noise signal N appearing on the tip portion of the leading end portion of the expanded luminance signal S4 is removed, but the leading end portion of the clipped luminance signal S3 has a sufficient amplitude without the noise N.

As described above, the present invention provides an FM demodulator for video signals such as luminance signals of VTRs, which is capable of removing noise in the portion where the luminance signal changes from the dark level to the white level without causing deterioration of the waveform characteristics.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. An apparatus having means responsive to video input signals for generating FM luminance signals, comprising:
   demodulation means for converting the FM luminance signals into base band luminance signals; and
   noise removing means including clipping means and amplitude expanding means for clipping and amplitude expanding the base band luminance signals for substantially removing noise carrying portions therefrom while maintaining the amplitude of the base band luminance signals at a predetermined level.

2. The apparatus of claim 1, wherein each of the video input signals includes a plurality of component signals, and said demodulation means includes filter means for separating the base band luminance signals from demodulated component signals.

3. The apparatus of claim 2, wherein the clipping means includes an amplitude level limiting circuit having a predetermined threshold level for determining the amplitude levels of the noise carrying portions of the base band luminance signals.

4. The apparatus of claim 2, wherein the amplitude expanding means includes a frequency resonance circuit responsive to a segment of each of the base band luminance signals for expanding the amplitude level thereof to the predetermined level.

5. The apparatus of claim 1, wherein the amplitude expanding means includes a frequency resonance circuit responsive to a leading edge of the base band luminance signals for expanding the amplitude thereof to the predetermined level.

6. An apparatus having means responsive to video input signals for generating FM luminance signals, comprising:
   demodulation means for converting the FM luminance signals to base band luminance signals;
   clipping means for clipping portions of the base band luminance signals above a predetermined amplitude for removing noise adjacent the peak of the base band luminance signals; and
   amplitude expansion means for restoring the clipped portions of the base band luminance signals above said predetermined amplitude.

7. An apparatus having means responsive to video input signals for generating FM luminance signals, comprising:
- demodulation means for converting the FM luminance signals to base band luminance signals having noise portions;
- amplitude expansion means for increasing the amplitude of the noise portions of the base band luminance signals from a first level to a second level; and
- clipping means for removing portions of the base band luminance signals above said first level.

8. A method of removing noise from video signals, comprising the steps of:
- separating base band luminance signals having a noise carrying portion from the video signals, and
- clipping and amplitude expanding the separated base band luminance signals for substantially removing the noise carrying portions therefrom while maintaining the amplitude of the base band luminance signals above a predetermined level.

9. The method of claim 8, wherein:
- the step of clipping includes removing the noise carrying portions above the predetermined level; and
- the step of amplitude expanding includes restoring the removed portions of the base band luminance signals.

10. The method of claim 8, wherein the step of amplitude expanding includes expanding the amplitude of the base band luminance signals from a first level to a second level; and
- the step of clipping includes removing portions of the amplified base band luminance signals above the first level.

11. The method of claim 8, wherein the step of amplitude expanding includes expanding the amplitude levels at the leading edge of the clipped base band luminance signals.

* * * * *